(12) United States Patent
Hüttermann et al.

(10) Patent No.: US 6,593,460 B1
(45) Date of Patent: Jul. 15, 2003

(54) METHOD FOR GRAFTING LIGNIN, POLYMERIZATES PRODUCED ACCORDING TO THE METHOD AND THE UTILIZATION THEREOF

(75) Inventors: Aloys Hüttermann, Göttingen (DE); Carsten Mai, Göttingen (DE)

(73) Assignee: Stockhausen GmbH & Co KG, Krefeld (DE)

( * ) Notice: Subject to any disclaimer, the term of this patent is extended or adjusted under 35 U.S.C. 154(b) by 0 days.

(21) Appl. No.: 09/581,108
(22) PCT Filed: Dec. 17, 1998
(86) PCT No.: PCT/EP98/08279
§ 371 (c)(1),
(2), (4) Date: Oct. 12, 2000
(87) PCT Pub. No.: WO99/31155
PCT Pub. Date: Jun. 24, 1999

(30) Foreign Application Priority Data

Dec. 17, 1997 (DE) .......................... 197 56 172

(51) Int. Cl.[7] .............................................. C08L 97/00
(52) U.S. Cl. ...................... 530/505; 530/506; 530/507; 527/400; 527/603; 524/76
(58) Field of Search .................. 530/507, 505, 530/506; 527/400, 603; 524/76

(56) References Cited

U.S. PATENT DOCUMENTS

| | | | | |
|---|---|---|---|---|
| 4,891,415 A | * | 1/1990 | Lin et al. | 527/400 |
| 5,116,904 A | * | 5/1992 | Meister et al. | 525/8 |
| 5,608,040 A | * | 3/1997 | H uttermann et al. | 530/500 |

FOREIGN PATENT DOCUMENTS

| | | | |
|---|---|---|---|
| EP | 0072445 | * | 2/1983 |
| EP | 0442508 | * | 8/1991 |
| WO | WO 94/12620 | * | 6/1994 |

* cited by examiner

*Primary Examiner*—Samuel A. Acquah
(74) *Attorney, Agent, or Firm*—Proskauer Rose LLP

(57) ABSTRACT

The invention relates to biologically degradable lignin graft polymers comprised of lignin and ethylenically unsaturated monomers which are formed by an enzymatically catalyzed polymerization method in the presence of organic peroxides. The polymerizates are suited, for example, for utilization as absorbers for water and aqueous liquids, as coagulants and thickeners, as water softeners and as dispersing agents.

27 Claims, No Drawings

METHOD FOR GRAFTING LIGNIN, POLYMERIZATES PRODUCED ACCORDING TO THE METHOD AND THE UTILIZATION THEREOF

The present invention relates to a method catalyzed through enzymes for the production of lignin graft polymer in solutions in which the polymerization product yield under the effect of organic peroxide combinations is high. The formation of undesirable, non-grafted side components is extensively suppressed. Furthermore the invention also covers lignin graft polymerization products produced according to the above-mentioned method with improved biological degradation as well as their utilization as building blocks in condensation resins, as binding and agglomeration media, as thickening media, as auxiliary products in petroleum drilling (drill rinsing fluid) and conveying, as a suspension and dispersion medium, as well as an auxiliary medium in textile and fiber upgrading.

Lignin is a high-molecular material which occurs in lignifying plants and is produced as a side product in the production of cellulose. Depending on the type of wood, the molecular structure of the lignin varies, i.e. the phenyl propane structure varies in the quantity of methoxy and hydroxy groups. Only a small portion of the lignin is water soluble, and the much greater, non-water-soluble portion can be extracted through solvents such as acetone or dioxane for example. The technical production utilizes mainly the alkaline or sulfite fusion process of wood, in which the water-soluble alkali or lignin sulfonates are produced as well as the organosolve process, in which the lignin is extracted from the wood by means of a mixture of solvent and water. The molecular weight of lignin lies in a range of 1000 to 150,000.

Since most of the lignin has always been burnt up in cellulose plants in order to obtain energy, many modification attempts were made in the past in order to provide a wider utilization for this occurring raw material. Processes in which a combination with synthetic polymerization products in form of graft polymers were realized were of particular interest.

Thus U.S. Pat. No. 4,687,828 describes high-molecular lignin graft polymers which are produced in polar, aprotic solvents with the utilization of the monomeric acrylamide and acrylamido-methylpropane sulfonic acid in a nitrogen atmosphere. As an initiator system a combination of calcium chloride, sulfuric acid, cer(IV) salt and auto-oxidation products of the dioxane (hydroperoxide) are used.

After a reaction period of 2 days at 30° C. the polymerization product is precipitated and separated in a non-solvent. Polymerization product with greater purity and improved solubility are obtained by renewed solving in water, dialysis during several days and freeze-drying. No information is given on the grafting degree, but from the examples it appears that only about 40% in weight of the lignin mass used is recovered, and the loss in monomer ranges within an extraction loss of approximately 80%. Other monomer types are not used in this method. Graft polymerizates are proposed for utilization as thickeners, flooding polymers and drill rinsing additives.

J. J. Meister et al report on the synthesis and characterization of radically polymerized lignin/acrylamide graft polymers [Journal of Polymer Science; Polymer Chemistry Edition, Vol. 22, 1963–1980 (1984)]. The graft polymerizates produced according to the method of U.S. Pat. No. 4,687,828 contained between 19 and 49% in weight of non-grafter homopolymer.

EP 442 508 A1 discloses a method for the production of graft polymerization products from lignin or lignin-containing wood pulp and non-saturated acrylate or methacrylate monomers which carries out the graft reaction in a solution excluding oxygen in the presence of halogen salt and a hydrogen peroxide initiator. Grafting is to produce fillers and reinforcers compatible with plastics. To separate side products the mixture of grafted and non-grafted components is dialyzed, the product yield varies considerably. No information is given concerning the degree of grafting or the grafting yield, since the substances are not separated. Non-lignin components remain in any case non-grafted.

WO 94/01488 teaches a method for enzymatic polymerization/modification of lignin or lignin-containing materials in water with peroxide and hydrogen peroxide at alkalic pH values, without using organic solvents. The lignin thus modified has a higher molecular weight and is used as binding material for wood particle boards. Polymerization in the presence of synthetic monomers is not described.

A method of lignin grafting which is a considerable improvement over the state of the art is described in DE 43 31 878 A1. Using radically oxidized enzymes, all organic combinations containing at least three carbon atoms and one oxygen, nitrogen or multiple binding function can then be grafted on lignin in water, organic solvents or water/solvent mixtures. As a result it becomes possible for the first time to make graft polymers from lignin, unsaturated monomers and other organic combinations. The reaction times are shorter than with other grafting methods and no inert gas atmosphere is needed. As a substrate, hydrogen peroxide is supplied for peroxidases and oxygen for phenoloxidases. The polymerization product yield is low and amounts to only 26% according to example 4. The grafting yield is also low with this enzymatic polymerization method.

No enzymatic lignin grafting method is known in the state of the art which combines the advantages of this method with increased polymerization product or grafting yield.

The task was therefore to find a method for the enzymatic grafting of lignin, lignin-containing substances and lignin sulfonates, making it possible to obtain higher grafting yields or at least higher polymerization product yields than in the state of the art, in particular than DE 43 31 878 A1 and through which it is possible to carry out the technical methods within acceptable reaction times. A further task of the invention was to prepare graft products from lignin, lignin-containing substances and lignin sulfonates with hydrophilically neutral, anionic, cationic unsaturated monomers and/or other organic combinations which make possible utilization in water or an aqueous fluid, and are amenable to biological decomposition.

The task is accomplished surprisingly in that the graft polymerization catalyzed through oxidizing enzymes is carried out on lignin in the presence of organic peroxides/hydroperoxides. In this method surprisingly neither the enzymes are damaged by the organic peroxides nor is the homopolymer portion increased, as may be expected when peroxidic initiators are added. By comparison with the utilization of hydrogen peroxide or oxygen, it is possible to note a clear increase in the polymerization yield and the portion of grafted monomer in the graft polymer increases. It is obviously and surprisingly possible to reduce the peroxide to a much lesser degree through the utilization of the combination of organic peroxides and oxidizing enzymes.

The yield in graft polymerization product according to the method of the invention is high and amounts preferably to more than 50% in weight, and more preferably over 60% in weight and most preferably over 75% in weight.

The graft polymerization products have an unexpected suitability for biological decomposition which is apparent through a decomposition of the molecular weight following the action of basidomycetes causing pocket rot. Following an incubation time of 48 days, the molecular weight is reduced by at least 50% through biological decomposition.

The utilization of organic peroxides with the enzymatic grafting has proven to be a decisive factor in increasing the grafting yield. Assuming its solubility in the solvent or solvent mixture used for grafting, the organic peroxides are used in quantities, as related to the monomers used, of 0.01 % in weight to 10% in weight, preferably of 0. 1% in weight to 5% in weight and most preferably of 0.25% in weight to 1.5% in weight. Organic aliphatic, cyclo-aliphatic and aromatic peroxides to be mentioned as examples are t-butylhydroperoxide, mono and dihydroxyperoxide of dioxane, acetylcyclohexanesulfonylperoxide, diacetylperoxidicarbonate, dicyclohexylperoxidicarbonate, di-2-ethylhexylperoxidicarbonate, tert.-butylperneodecanoate, tert.-butylperpivalate, dioctanoyl peroxide, dilauroyl peroxide, dibenzoyl peroxide, tert.-butylper-2-ethyl-hexanoate, tert-butylpermaleinate, bis-(tert.-butylperoxide)-cyclohexane, tert-butylperoxiiospropylcarbonate, tert.-butylperacetate, 2,2'-bis-(tert.-butylperoxi) butane, dicumylperoxide, di-tert.-butylperoxide, di-tert.-amylperoxide, pinanhydroperoxide, p-methanehydroperoxide, cumolhydroperoxide, peroxyphthalate. t-Butylhydroperoxide and mono and dihydroxyperoxide of dioxane are especially preferred.

The utilization of redox co-initiators can have a positive effect on the polymerization product and grafting yield. For example, the heavy metal salts of copper, cobalt, iron, manganese, nickel and chrome should be mentioned, whereby $Fe^{2+}$ and $Mn^{2+}$ have proven themselves especially well. Reducing components, such as ascorbinic acid, sodium sulfite, sodium bisulfite, sodium formaldehyde sulfoxylate lead to clear reduction of the polymerization activity. The added utilization of redox co-initiators makes it possible to carry out the polymerization at lower temperature. The quantities of redox-co-initiators normally used amount to approximately 0.01 to 5% with reducing compounds and 0.1 to 100 ppm, preferably 0.5–10 ppm with heavy metals.

The lignin-modifying enzymes to be used according to the invention consist of oxidase, e.g. laccase, lignin peroxidase, mn peroxidase or their mixtures. Laccase is preferably used. The concentrations of enzyme used may vary widely and depends among other things on the enzyme type and the initiator system used, as well as on the number of phenoxy radicals to be produced. Depending on the monomers used, guideline concentrations are 200 to 0.1 U per g of monomer, preferably 100 to 1 U per g of monomer and most preferably 25 to 1 U per g. Of monomer. The enzyme quantity which converts I mMol substrate per minute is defined as enzyme unit U.

To improve the solubility of the enzymes in organic solvents, these may be integrated into enzyme matrix complexes. Such enzyme matrix complexes and their production are described in EP 354 485.

As a grafting base, lignin, lignin derivates, lignin-containing materials are used according to the invention, in particular the lignin and lignin sulfonate of different vegetal origin and with different molecular weights. Ullman's Encyclopedia of industrial Chemistry (5th ed. 1990, Vol 15) contains an overview regarding lignin which can also be used with the grafting method according to the invention.

Based on the sulfonate groups, lignin sulfonate-based grafted polymers possess improved solubility in water as compared with products based on sulfonate-free lignin. Depending on the application intended for the graft polymers, the spectrum ranges from low-molecular crystallization inhibitors for hard water component to high-molecular flocculents and thickeners as well as to cross-linked super-absorbers, with lignin of different molecular weights is used for grafting.

The portion of lignin components in the monomer mixture may fluctuate within wide limits, but should not exceed 50%, as this results in lower yields and molecular weights. In order to obtain high molecular weights over 200,000 it is often advantageous to prevent the quantity of lignin from exceeding 25% in weight, preferably 15% in weight, and most preferably 10% in weight.

The augmentation of the lignin portion in the reaction mixture also results in increased integration of the lignin in the graft polymer. Using UV-vis-spectrum of the GPC eluate of graft polymers it was possible to show that this was not just one mixture of graft and lignin homopolymer, but that grafting takes place over all the lignin portions.

In cases of insufficient solubility of the lignin components in the reaction medium it is possible, through the addition of tensides, to still render the lignin derivate accessible to the grafting reaction. The selection of the tenside or tensides is determined on the one hand by the structure of the lignin components and on the other hand on the composition of the reaction medium and is carried out in accordance with methods with which the person schooled in the art would be familiar.

Based on the enzymatic grafting method according to the invention, a great number of unsaturated organic compounds can be used for the grafting on the lignin component. In form of unsaturated compounds, the following anionic, cationic and neutral water-soluble monomer building blocks or their mixtures mentioned under a) to d) can be used for the enzymatic grafting. The enzymatic grafting also makes possible co-polymerization with the hydrophobic monomer building blocks mentioned under e). A whole spectrum of applications results already from the multiplicity of the monomers that can be used under the invention, since cationic, anionic as well as amphoteric graft polymerization products can be produced.

a) Water-soluble, acid-group-bearing, ethylenically unsaturated monocarbonic acids, its anhydrides and whose salts; sulfonic acid such as unsaturated dicarbonic acid, its anhydrides as well as their half-esters or half-amides. As an example are mentioned (meth)acrylic acid, (meth)allylsufonic acid, vinyl ethanoic acid, 2-acrylamido-2-methylpropane sulfonic acid, vinylsulfonic acid, styrolsulfonic acid, vinylphosphonic acid, maleinic acid, fumaric acid, itaconic acid as well as half esters and half amides of the dicarbonic acids mentioned earlier, whereby the half-esters and half-amides are accessible to amines and amino-alcohol through reaction of the corresponding acid anhydride with alcohol. Preferred monomers carrying acid groups are: acrylic acid, methacrylic acid, maleinic acid and maleinic acid anydride, acrylamido-2-methylpropanesulfonic acid and (meth)allysulfonic acid or their salts.

b) Among unsaturated compounds of the group b) are non-ionic water-soluble monomers, e.g. meth (acylamide), (meth)acrylnitrile, hydroxyethyl(meth) acrylate, N-vinylpyrrolidone, N-vinylimidazole, N-vinylacetamide, N-vinylformamide, N-vinyl-N- methylacetamide, N-methylol(meth)acrylamide as well as alkoxylated monomers to which one arrives either through alkoxylation of ethylanic unsaturated compounds carrying at least one hydroxy-or amino group, or else through the conversion of the aloxy adducts of saturated aliphatic, cycloaliphatic, aromatic alcohol, amine or thiole with ethylenic unsaturated carbonic acid, reactive carbonic acid derivates or allylhalogenides. Examples are ethylene and/or propylene oxide adducts of (meth)allylalcohol, (meth)alylamine as well as hydroxyethyl(meth)acrylate, possibly others converted with reactively saturated acid derivatives. In addition, reaction products of preferably one-sided end-locked ethyleneglycol, isopropylglycol, butylglycol as well as nonylphenol, isotridecanol with ethylene or propylene oxide and continued reaction of the alkylenoxide adducts with (meth)acrylic acid, allychloride or other reactive, unsaturated acid derivatives such as e.g. the acid hydrides, the acid halogenides or their acid esters should be mentioned. Among these adducts methoxypolyethylene glycol-(meth)acrylate, nonylphenolpolyglycol(meth)acrylate and allylalcohol, each with 5 to 30 ethylenoxide units are preferred.

c) As building blocks of the c) group, monomers are used which are able to lend a catonic charge to the graft polymer or which form amphoteric polymerizates in combination with anionic monomers. Examples for this are N,N-dimethylaminopropyl(meth)acrylamide, N,N-dimethylaminopropyl(meth)acrylate, N,N-dimethylaminoethyl(meth)acrylamide, N,N-dimethylaminoethyl(meth)acrylate, whereby the amino nitrogen is possibly quaternated or neutralized. N,N-dimethylaminoethylacrylate and N,N-dimethylaminopropylacrilamide are utilized in preference.

d) To produce graft polymers capable of swelling in water but no longer water soluble or graft polymers with higher molecular count, ramified but still partially soluble, the utilization of cross-linking monomers may be necessary in limited quantities. These cross-linking substances are integrated in the polymerization during polymerization or are used subsequently to cross-link the already existing polymer molecules. All compounds which contain at least two ethylenically unsaturated double bonds and a group which is reactively functional with regard to the acid group, or several groups which are functionally reactive regarding the acid group can be used as interlinking agents. Examples for this are: methylenebisacrylamide, acrylate and methacrylate of poyoles such as butandiol-diacrylate, hexandiol-dimethacrylate, polyethylenglycoldiacrylate and trimethylolpropantriacrylate and/or the acrylate and methacrylates of the oxalkylated mentioned polyoles such as oxalkylated trimethylopropantriacrylate. Furthermore di- and polyester of polyoles and oxethylated polyoles with unsaturated monocarbonic acid and/or polycarbonic acid such as (meth) acrylic acid esters of 1,2 propylene glycol pentaerythrite, glycerin and polyglycerin as well as monoester of unsaturated alcohol and ethoxylated unsaturated alcohol with unsaturated monocarbonic acid and/or monocarbonic acids such as (meth) allylacrylate and -methacrylate, mono(meth) allylmaleinate, (meth) allylpolyethyleneglycoletheracrylate and -methacrylate, (meth)allylitaconate, (meth) allylpolyethyleneglycolether-itaconate and mono (meth)allylpolyethylenglycolether-maleinate. In addition diallylacrylamide, diallyphthalate, diallyladipate, triallylcitrate and trimonoallylpolyethyleneglycolethercitrate. In addition allylether of di- and polyoles and their oxethylates, as well as the diallylether of ethylenglycol, diethylenglycol, polyethylenglycol, the triallylether of glycerin, oxethylated glycerin, trimethylolpropane and oxethylated trimethylolpropane, the tetraallylether of pentaerythrite and oxethylated pentaerythrite as well as tetraallyloxiethane and polyglycidylether such as for example ethylenblycoldiglycidether and glyceringlycidylether. In addition amines and/or their salts and amides with at least two ethylanically unsaturated alkyl groups such as di- and triallylamine and tetraallylammoniumchloride.

e) All monomers which can be co-polymerized with a), b), c) and d) can be used as monomers. They are used for further modification of the graft polymers and thereby make it possible to achieve optimal adaptation to the graft polymers which are to be used according to the invention. Consequently the monomers under d) may have a hydrophilic as well as a hydrophobic character. Examples are vinyl acetate, vinyl propionate, (meth) acrylic acid ester, versatic acid vinyl ester known as styrol.

The application characteristics of already pre-interlinked graft polymerization products can be improved in most cases significantly through a post-interlinking. This post-interlinking can be effected in principle with all moisture contents of the pre-interlinked polymer gel. In a preferred embodiment the polymer gel is dried up to a water content of 5–20% in weight, preferably a maximum of 10% in weight at temperatures in the range of 100–190° C. Following this the dried material is ground into a polymerization product powder with a grain size in the range of 20–3000 $\mu$m, preferably 150–850 $\mu$m. The post-interlinking of the polymerization product takes place on the surface of the polymer particle with at least one double or multiple functional interlinking medium reacting with acid groups, preferably carboxyl groups, which is applied preferably in form of an aqueous solution. Polyol such as ethylenglycol, 1,2-propyleneglycol, 1,4 butandiol, glycerin, di- and polyglycerin, pentaerythrite, oxethylates of such polyole as well as its ester with carbonic acid or carbon dioxide is suitable as the post-interlinking medium. The addition of an esterification catalyst, e.g. p-toluolsulfonic acid or phosphoric acid is advantageous. Additional suitable interlinking media are di and polyglycidylether of polyole and plyethylenglycol and salts of multi-valent cations. The post-interlinkers are used in quantities of 0.01 to 20% in weight, preferably 0.1 to 10 and most preferably 0.1 to 3% in weight relative to the polymerization product.

The post-interlinking is normally carried out at temperatures in the range of 100–250° C., preferably 150–200° C. in a mixing aggregate, i.e. a Nara mixer. Highly reactive post-interlinkers can also be used at lower temperatures of 20 to 100° C. Post-interlinking often takes place also on graft polymer particles suspended in inert solvents. The utilization of different post-interlinkers or multiple post-interlinking is possible.

Depending on the application-specific characteristics in the field of hygiene, mostly monomers carrying acid groups are used for the synthesis of interlinked superabsorbing polymers on the monomer side, and in an especially preferred embodiment acrylic acid and methacrylic acid, whereas superabsorbing polymers show in addition acrylamide, methacrylamide and monomer particles containing sulfonate in the plant cultivation. Flocculants and dispersion products are produced on anionic as well as on cationic monomer basis; acrylamide is used preferably as the co-monomer. The polymerization products used in the fields of water hardening and washing and cleaning products are preferably built up from monomers containing carboxylate groups, however in these areas, co-monomers containing sulfonate and alkoxylate groups have proven themselves.

In addition it is often advantageous if inorganic per-compounds are added, insofar as they do not interfere with the grafting reaction or reduce the grafting yield significantly. The addition of inorganic peroxides, in particular, towards the end of polymerization makes consistent reduction of the residual monomer contents possible, so that other expensive processes for their separation can be omitted. These per-compounds are activated to special advantage by adding reducing compounds. Examples of inorganic per-compounds to be used according to the invention are: Sodium peroxodisulfate, calciumperoxodisulfate, ammoniumperoxodisulfate, peroxyborate.

Instead of the inorganic peroxides mentioned before, azo-initiators can also be used advantageously. The following azo-initiators are listed as examples of initiators that can be used according to the invention: 2,2'-azobis(4-methoxy-2,4-dimethylvaleronitrile), 2,2'-azobis-(methyl-N-phenylpropionamidine)dihydrochloride, 2,2'azobis-(2-methylpropionamidine)dihydrochloride, 2,2'-azobis-(2,4-dimthylvaleronitrile), 2,2'-azobis-(isobutyronitrile), dimethyl-2,2'-azobisisobutyrate.

The method according to the invention is carried out in water, organic solvents or in mixtures of water and solvents. Among others, the following can be used as solvent components: dimethylsulfoxide, acetone, dioxane, methylpyrrolidone or their mixtures. In case that a mixture of water and solvent is used, the ratio of water and solvent is of course determined also by the miscibility of the two components. In a preferred embodiment however, the share of water is more than 50% in weight. Working purely with water, without organic solvents, is especially preferred.

The graft polymerization can take place in normal polymerization reactors equipped with the necessary aggregates for stirring, measuring solid, fluid and gaseous materials, for heating and for cooling. The grafting base is placed in the reactor together with the enzymes and is then mixed immediately or in course of polymerization by the monomer components. It is often an advantage to also first add a small portion of the monomers and to measure the remainder over a longer period of time. If interlinked graft polymerization products are being produced, different polymerization devices such as reaction mixers or polymerization bands are accordingly required. The temperatures for enzymatic polymerization are limited upward by the temperature stability of the enzyme and downward by the activity of the enzyme or by the polymerization speed. Preferred ranges of the polymerization temperature are between 10 and 60° C. and especially preferred between 20 and 50° C. The polymerization period may fluctuate between 1 hour and 2 days, depending on the activity of the enzyme, of the phenol components, of the monomers and of the graft polymerization temperature.

An atmosphere of protective gas may be necessary during the polymerization in order to avoid radical chain breakage.

The pH value during the graft polymerization according to the invention can fluctuate within a range of 3 to 8, preferably 4 to 5. The point in time for the neutralization of the monomer components depends on the required pH value of the graft polymerization solution and may accordingly occur before, during or after polymerization, or neutralization may occur in partial steps continuously or discontinuously.

Inorganic or organic alkali and acids can be used as neutralization means, e.g. ammonia, ammonium hydroxide, alkali-hydroxide, -carbonate and -hydrogen carbonate, amines, alkylamines, alkanolamines, hydroxylamines, mineral acids, organic sulfonic acids.

The concentration of deposit may fluctuate during the graft polymerization and depends among others on whether high or low molecular weights are to be produced, whether great or small portions of monomers are present, whether interlinked or soluble graft polymers are to be produced or whether water, organic solvents or a mixture of water and solvents are used as the reaction medium. In any case care should be taken that the deposit concentration be laid out in such manner that the required optimal graft polymerization temperature can be maintained.

Due to the phenolic components, the graft polymerization products have a more or less distinct coloring, which may be reduced or eliminated if necessary by oxidative or reductive additions. In this context hydrogen peroxide, sulfite salts or phosphoric acid have proven to be good bleaches.

Upon completion of polymerization the soluble polymerization products are either taken to their application directly, or are isolated in form of powder in case of special requirements by removing the solvent (spray drying/evaporation/freeze-drying). Precipitation can also be achieved by adjusting the pH value and/or by adding non-solvents. For some application a dialysis for the removal of low-molecular portions has proven successful. Dialysis membranes with different exclusion limits are available for sale.

In principle, polymerization can also be carried out in form of a suspension polymerization, whereby the aqueous reaction phase is dispersed with the help of suspension stabilizers in an organic phase which may consist e.g. of cyclohexane, and is polymerized in form of this suspension. Following this, water can be distilled out of the suspension azeotropically and the solid polymerization particles can be filtered without problem out of the organic base and can be conveyed to their application following drying.

Interlocked graft polymerizates are reduced, torn apart and dried either after or even during polymerization, and are ground to a given particle size as required by their application.

The molecular weight median of the graft polymers can be influenced over a wide range and vary between 1000 and 10 million. Due to technical application requirements different molecular weights are necessary for different areas of application. Thus for example, very high-molecular polymerization products are used in the field of flocculation and concentration aides, and for water hardening, dispersion and drilling rinsing the polymers according to the invention are used with comparatively low molecular weights. The molecular weights of the grafting base on the one hand and the enzyme/monomer ratio on the other hand are essential control parameters for the molecular weight.

The graft polymerization products according to the invention can be used to advantage in many areas of application. Among these absorption of aqueous and organic liquids, the controlled release of previously absorbed substances, flocculation, water hardening, dispersion, concentration and agglomeration are to be mentioned in first rank.

For the absorption of aqueous and organic liquids, interlinked polymerization products are to be considered above all, a s these swell when absorbing the liquids and store them. The kind of monomers to be grafted and the selection and quantity of the interlinkers as well as, if applicable, post-interlinking can serve to control the absorption behavior of the polymerization products, in particular also the absorption behavior under load which is important for the utilization of the products in diapers. By using partially neutralized acidic monomers, hydrophilic polymerization products are produced which absorb water and aqueous liquids, in particular blood and urine and are especially well suited for applications in the sanitary sector (diapers, incontinence products), since, contrary to purely synthetic absorbers, they are biologically degradable. In addition, the hydrophilic absorbers are used for food packaging and water insulation of cables. Integration into absorbing flat formations is possible, and synthetic and/or natural fibers in form of fabric or fleece into which the absorbers according to the invention are incorporated are used preferably to build up these surface formations. In the agricultural area the absorbers according to the invention are effective as water storers in the root areas of plants.

The absorbing polymers can also release active ingredients previously added to them with delay over a long period of time. An example would be additions of insecticides or fertilizers which make it possible to fight insects continuously and effectively or provide for an automatic nutrient supply to the plants over a long period of time. It is especially advantageous with these applications that the absorbers according to the invention are biologically degraded at the end of their utilization.

In the area of flocculation products, the polymerizates according to the invention are used in their soluble form, whereby high molecular weights of over 1 million are preferred. Typical flocculation processes are carried out e.g. in municipal sewerage, industrial sewerage, in chemical/technical processes, e.g. for red-slurry flocculation or in paper production or in the preparation of drinking water. Depending on the flocculation task to be performed, the polymers according to the invention must be given an anionic, cationic or amphoteric character through the selection of the monomer components to be polymerized. The polymers according to the invention are used as flocculants in concentrations of 0.1 to 5000 ppm, preferably 0.1 to 1500 and most preferably 0.1 to 500 ppm, depending on the flocculation process.

When the polymers according to the invention are used as incrustation inhibitors in washing and cleaning products, their good complexing properties for multi-value ions, e.g. calcium, iron and magnesium, and on the other hand their good dispersion capability are great advantages. The latter capability keeps pollutants and precipitated hard-water components in suspension during the washing process. These characteristics also make it possible to use the polymerization products advantageously in the fiber and textile treatment, in particular in bleaching and dying baths as well as in the preparation of raw fibers and in desizing, where heavy metals and the dispersion of hard water components, accessory materials of raw fibers and excess dying pigments must also be complexed. In water circuits the polymerization products are used to prevent the precipitation of hard water. Washing and cleaning products normally contain 0.1 to 20% in weight, preferably 0.5 to 12% in weight of the polymers according to the invention. For water hardening, polymer concentration of 0.2 to 5000 ppm, and preferably 1 to 2000 ppm are used. In textile treatment 0.1 to 10, preferably 0.1 to 5 g of polymer is added per liter of liquor.

The good dispersion characteristics of the polymerization products according to the invention are also used for the production and stabilizing of dispersions of organic dying pigments and inorganic pigments (e.g. titan dioxide, calcium carbonate, talc) as well as for the dispersion of drilling slurry produced in drilling operations. The dispersion of organic dye pigments and inorganic pigments normally requires 1 to 20% in weight of polymer as related to the pigment, whereby the ratio of polymer and organic dying pigment may also come to 1:1 in some extreme cases.

For the water hardening and dispersion application the preferred molecular weights of the polymer according to the invention lies in the range below 100,000, preferably below 50,000 and most preferably below 25,000.

If the polymerization products according to the invention are used as thickeners for water or aqueous preparations, e.g. in color printing, paper slip coating, painting dispersions or in tert. petroleum drilling, high-molecular polymers are preferred, i.e. the molecular weights should be preferably above 1 million so that good thickening performance may take place. In pigment printing for example, up to 10 g of polymer per liter of printing paste is used, and in petroleum drilling up to 1000 ppm.

The polymers according to the invention are also suitable as binding and agglomerating media. The agglomeration of filter dust, soot, fine coal, ballast coal and other dust and powders should be mentioned, as well as the joining of wood materials and core sanding (casting).

The biological degradability of the graft polymerization products according to the invention is surprising, since in the past state of the art synthetic graft branches as well as phenolic graft bases, in particular lignin, were classified as non-degradable. The degradability of the graft polymerizates was examined through the action of basidomycetes provoking pocket rot and was evidenced by the decrease of the molecular weight.

The production and application of the polymerization products according to the invention are explained in further detail through the following examples.

List of the abbreviations used for monomers and initiators;

AMPS acrylamidomethyl propane sulfonic acid
t-BHP tert.-butyl hydroperoxide
DIMAPA dimethylaminopropyl acrylamide
MAS sodium methallysulfonate
MBAA methylene bisacrylamide
TMPTA trimethylolpropandiacrylate

EXAMPLES AND COMPARISON EXAMPLES

In the following tests laccase is used for example for the group of enzymes to be oxidized and used according to the invention. This is an enzyme of the Novo company, Denmark. The enzyme activity amounts to 190 U/mL. The enzyme unit U is defined as the enzyme quantity which converts 1 mMol substrate per minute.

General Description of Tests - Examples 1–13

Lignin and monomer components were dissolved in 36 ml bidistilled water and the resulting mixture was set to pH 4 with NaOH. Following this, 100 $\mu$l of a solution containing $(NH_4)_2Fe(SO_4)_2 6H_2O$ (Mohr's salt) and laccase were added by pipette, and the reaction was started by adding t-butylhydroperoxide (t-BHP). The reaction mixture was kept for 48 hours in a water bath at 35° C., whereby the viscosity of the solution increased considerably. In order to remove non-converted monomer from the mixture, dialysis was effected for 24 hours against bidistilled water (dialysis hose Serva, cut-off 12–14000), the solution which was obtained was narrowed at the rotation evaporator and was freeze-dried.

The molecular weights were found by means of gel permeation chromatography. Pullulan standards were used as the molecular weight standards. The following molecular weight means were obtained from the chromatograms: Mn: Mean number, Mw: Mean weight; Mp: Molecular weight at the peak of the elution curve.

Example 1

3.43 ml acrylic acid
480 mg Induline-Sn (hemicellulose-free, water-soluble, sulfonated lignin of Westvaco Chem., USA)
0.4 g MAS
80 µl t-BHP
200 µl laccase
2.8 mg $(NH_4)_2Fe(SO_4)_2 6H_2O$ yield: 2.68 g (=59.8%)
Molecular weights: Mp=17,000, Mw=24,500

Example 2

3.04 ml acrylic acid
800 mg Induline-Sn
0.4 g APMS
160 µl t-BHP
200 µl laccase
2.8 mg $(NH_4)_2Fe(SO_4)_2 6H_2O$ yield: 2.77 g (=63.0%)
Molecular weights: Mp=16,500, Mw=43,500

Example 3

3.04 ml acrylic acid
800 mg. Induline-Sn
0.4 g AMPS
80 µl t-BHP
200 µl laccase
2.8 mg $(Nh_4)_2Fe(SO_4)_2 6H_2O$ yield: 2.9774 g (=67.7%)
Molecular weights: Mp=45,000, Mw=80,000

Example 4

3.43 ml acrylic acid
480 mg Induline-Sn
0.4 g MAS
80 µl t-BHP
200 µl laccase
2.8 mg $(NH_4)_2Fe(SO_4)_2 6H_2O$ yield: 3,5496 g (=79.2%)
Molecular weights: Mp=31,000, Mw=36.000

Comparison Example

The comparison example is identical with the example 4 of DE 43 31 878A1. In the latter a total of 937 mg of polymerization product was obtained from 0.4 g organosolvlignin and 3.2 g acrylamide with the initiator system laccase/oxygen. The yield in this comparison example therefore amounted to 26%.

Example 5

400 mg wafex SR (sulfonate lignin with approx. 8–12% reduction parts, of the Lignotech company, Sweden)
23.1 mg MBAA (05%)
80 µl t-BHP
180 µl laccase
2.8 mg $(NH_4)_2Fe(SO_4)_2 6H_2O$ gel-like product Example 6

As in example 5, but with 32.0 mg MBAA (0.8%) gel-like product

Example 7

4.0 ml acrylic acid
400 mg wafex SR
12 mg MBAA (03%)
80 µl t-BHP
180 µl laccase
2.8 mg $(NH_4)_2Fe(SO_4)_2 6H_2O$ (almost) gel-like product Example 8

3.2 g acrylamide
0.76 ml acrylic acid
400 mg wafer (sulfonate lignin with approx. 25% reduction parts, of the Lignotech company, Sweden)
23.1 mg MBAA (0.5%)
80 µl t-BHP
180 µl laccase
2.8 mg $(NH_4)_2Fe(SO_4)_2 6H_2O$ gel-like product Example 9

4.0 ml acrylic acid
400 mg wafex
28.9 µl triallylamin (0.5% in weight/monomer)
80 µl t-BHP
180 µl laccase
2.8 mg $(NH_4)_2Fe(SO_4)_2 6H_2O$ almost gel-like product Example 10 same as Example 9, but with:

23.1 mg trimethylolpropantriacrylate (TMPTA) (0.5% in weight/monomer) not gel-like Example 11 Same as Example 9 but with:

32.0 mg TMPTA (0.8% in weight/monomer) not gel-like product

Example 12

8.0 ml acrylic acid
800 mg wafex
57.8 µl triallylamine (0.5% in weight/monomer)
160 µl t-BHP
360 µl laccase
5.6 mg $(NH_4)_2Fe(SO_4)_2 6H_2O$ Not gel-like product Example 13

4.0 ml acrylic acid
800 mg wafex
23.1 mg MBAA (0.5 %)
80 µl t-BHP
180 µl laccase
2.8 mg $(NH_4)_2Fe(SO_4)_2 6H_2O$ gel-like product Example 14

2.2 g sulfonate lignin, 22 ml acrylic acid and 230 mg methylene bisacrylamide (MBAA) were dissolved in 200 ml bidistilled water and were adjusted to pH4 by means of caustic soda. Following this, 15 mg $(NH_4)_2Fe(SO_4)_2 6H_2O$ (Mohr's salt) were dissolved in 1 ml bidistilled water and 1 ml laccase was added by pipette, and the reaction was started by adding 400 μl t-butylhydroperoxide. The reaction mixture was kept for 48 h in the water bath at 30° C. Following a reaction time of 2 days, the polymerization product was dried at 80° in a drying box.

Example 15

Production as in example 14, however with 185 mg MBAA

Example 16

Production as in example 14, however without MBAA and with 2.2 g AMPS and 19.8 g acrylamide.

Molecular weight: Mw=336,000, Mn=68,000

Example 17

Production as in example 16, however with one half of initiator concentration.

Molecular weight: Mw=386,000, Mn=96,160

Example 18

Production is as in example 16, however 2.2 g MAS are used instead of AMPS

Molecular weight: Mw=63,000, Mn=25,290

Example 19

In this case sulfate lignin (indulin) not soluble in water was used without subsequent sulfonation. In order to increase the accessibility of the lignin molecule, it was first dissolved in 140 ml 0.01 N caustic soda and 16.6 g acrylamide, 11.4 ml trimethacryloylamidopropylammonium (60% solution) as well as 1 ml Tween 80 were added. Following this the pH value was adjusted to a value of 5 through slow titring with 0.1 N chloric acid. In this process the lignin forms a voluminous suspension. 15 mg $(NH_4)_2Fe(SO_4)_2 6H_2O$ (Mohr's salt) was dissolved in this reaction mixture with slight agitation and 1 ml bidistilled water and 1 ml laccase (6000 u/ml) were added by pipette and the reaction was started by adding 400 μl t-butylhydroperoxide. The reaction mixture was kept in the water bath for 48 h at 35° C. and was then dried at 80° C. Molecular weights: Mw=890,000, Mn=309,140.

Examples 20–21

The phenols listed in the table below were dissolved in a small mount of caustic soda and 1 g acrylamide in 7 ml water was added. The pH value was adjusted to 4.5 with 10% of sulfuric acid. Following this 20 μl t-butylhydroperoxide and 50 μl laccase (Novo) were added by pipette. After a reaction time of 2 days in the water bath the solution obtained was dialyzed in a dialysis hose with a cut-off of 1000 g/mol against water in order to remove the monomer residue. The retained matter was then freeze-dried and the yield was calculated:

| Example No. | Lignin | Yield [g] | Yield [% of weight] |
|---|---|---|---|
| 20 | 160 mg sulfonate lignin plus 100 mg $Ca(NO_3)_2$ | 0.006 | 85.9 |
| 21 | 160 mg sulfonate lignin plus 16 mg sodium peroxodisulfate | 0.896 | 77.2 |

Example 22

Sulfonate lignin was dissolved in 8 ml 0.84 m caustic soda and 1 ml acrylic acid was added, so that a pH value of 4.1 was reached. Following this 20 μl t-butyl hydroperoxide and 50 μl laccase (Novo) were added by pipette. Following a reaction time of 2 days in the water bath the solution obtained was dialyzed in a dialysis hose with a cut-off of 1000 g/mol against water in order to remove the monomer residue. The retained matter was then freeze-dried and the yield was calculated;

| Example No. | Lignin | Yield [g] | Yield [% of weight] |
|---|---|---|---|
| 22 | Sulfonate lignin | 1,140 | 98 |

Determination of the decomposition capability

The decomposition capability of the tested polymers was investigated by reducing the molecular weight of the synthesized polymers. Different graft polymers were produced on the basis of lignin/acrylic acid, and these were subjected in liquid cultures to an incubation with basidomycetes causing pocket rot. The selected phylum was Pleurotus ostreatus.

Carrying out the decomposition investigation
Liquid cultures

The liquid cultures were first bred in three 500-ml Erlenmeyer flasks with 100 ml medium. Vaccination was effected in each instance with three 1-$cm^3$ malt agar pieces of the phylum culture, incubation time was three weeks in a dark culture chamber at 23 ° C.

Conducting the decomposition test 0.5 g polymer were dissolved in 100 ml of the corresponding medium per Erlenmeyer flask, whereby 3 parallels were used per polymer species. Following autoclaving and cooling, 1 ml of each polymer solution was taken for the determination of the molecular mass through HPLC (GPC). The three-week old liquid cultures were homogenized by means of a Turrax rod and 1 ml of the suspension obtained was added through pipette to the polymer solutions. The incubation lasted over a period of 48 days in a dark culture chamber at 23 ° C. After build-up of the incubation, 1 ml of the culture medium was again taken and the molecular mass of the obtained polymer was determined.

High-pressure liquid chromatography

For the preparation of the HPLC the samples were centrifuged in order to remove insoluble mycel residues. The molecular weight was determined by means of a size-exclusion chromatography (SEC) on a TSK gel and HEMA BIO-column set and was displayed by means of a diode array detector. To determine the molecular weight and its distribution, calibration was supplied with polyacrylic acid standards (Mp of 855 to 11000000, Na salt linear, (PPS Mainz).

Instruments

High-pressure liquid chromatography system (Hewlett Packard, Palo Alto, Calif., USA, 1090 Liquid Chromatograph with Pascal work station and diode array detector DAD)

SEC columns: TSKgel 6000 PWx1, TSKgel 5000 PWxl (each 13 μm; 7,8*300 mm) (ToSoHaas, Stuttgart) and HEMA BIO 1000 (10 μm; 8*300 mm) (Polymer Standard Service PPS, Mainz)

SEC Conditions

Eluent: 0.15 M NaCl solution in highly purified water (water purification system "Milli-Q", Millipor, Eschborn
Flow: 1 ml/min
Detector: Diode Array Detector DAD, Hewlett Packard, Palo Alto, Calif., USA
Temperature: 35° C.
Calibration standards: Polyacrylic acid-Mp of 855 to 11000000, Na salt, linear (PPS, Mainz)
Injection volume: 20 μl
Internal standard: Benzol sulfonic acid Na-Salt 0.1 mg/ml sample For lignin acrylic acid graft polymers the following molecular weight changes resulted from biological decomposition:

| Lignin components, portion of graft polymer | Molecular weight Before incubation | After 48 days | % Reduction |
|---|---|---|---|
| Lignin sulfonate (5%) | 325,810 | 151,379 | 53.5 |
| Lignin sulfonate (10%) | 254,509 | 99,281 | 61.0 |
| Lignin sulfonate (20%) | 175,159 | 58,173 | 66.8 |
| Lignin sulfonate (30%) | 128,964 | 45,665 | 64.6 |

Determination of retention

The retention capacity of the interlinked polymerization products for aqueous liquids is determined for a 0.9% table salt solution. The test is conducted as follows when the polymerization product has been dried, ground and sieved to 180 to 800 μm: 200 mg test substance are sealed in a teabag and are immersed for 30 minutes in a 0.9% solution pf NaCl, are dripped off for 10 minutes and are centrifuged for 5 minutes in a centrifuge (23 cm diameter, 1400 rpm) and are weighed. A tea bag without water-absorbing polymerization product is processed together with the others as a so-called blind value.

RETENTION=(Out-weight-blind value)/In-weight polymer (g/g)

| Example | Retention [g 0.9% NaCl-Solution/g polymer] |
|---|---|
| 14 | 35.4 |
| 15 | 43.2 |
| 5 | 63.6 |
| 6 | 54.7 |
| 8 | 30.1 |
| 10 | 47.4 |

Calcium carbonate dispersion capacity

It is an essential characteristic of co-builders in washing and cleaning products that they are able to prevent precipitations of earth alkali or heavy metal salts that are difficult to dissolve and may cause incrustations, for example, on laundry items. In order to determine the calcium carbonate dispersion capacity (CCDK) [according to Richter Winkler in Tenside Surfactants Detergents 24 (1987) pages 213–216] the following procedure was followed:

1 g of product (dry substance) is dissolved in 100 ml distilled water and is mixed with 10 ml 10% sodium carbonate solution. A pH value of 11 is achieved with caustic soda and is tritiated with 0.25 ml calcium acetate solution until a first lasting cloudiness appears. The indication of the CCDK is in mg $CaCO_3$/g dry substance.

| Example | CCDK [mg $CaCO_3$/g DS] |
|---|---|
| 1 | 143 |
| Commercial product Acrylic acid/maleinic acid-copolymer | 256 |

Calcium binding capacity according to the Hampshire test

A solution of 1 g product (dry substance) in 100 ml water is displaced with 2 ml of 10% sodium carbonate solution and is adjusted to 11 pH by means of caustic soda. Tritiating with 0.25 mol calcium acetate solution is effected until a first lasting cloudiness appears. The result is in mg $CaCO_3$/g dry substance:

| Example | Hampshire value [mg $CaCO_3$/g DS] |
|---|---|
| 18 | 1328 |
| maleinic acid/acrylic acid copolymer | 590 |

The polymerization products according to the invention have excellent calcium binding capacity according to Hampshire, well above the synthetic co-polymerization products normally on the market which are used as co-builders for washing products.

Hard-water boiling resistance

This test affords a measure for the capability of the polymer to inhibit a precipitation of hard water components.

A calcium chloride solution (33.6° dH pure calcium hardness) is mixed with a given quantity of 10% polymerization product solution, is heated for 5 minutes on a heating plate and is then evaluated for cloudiness. By varying the quantity of polymer one determines the concentration with which a clear solution is obtained for the first time. This information is given in grams of polymer liter of hard water.

| Example | Hard water resistance [g polymer/l] |
|---|---|
| 1 | 2.0 |
| 2 | 1.0 |
| 16 | 0.5 |
| Maleinic acid/ acrylic acid copolymer | 2.0 |

The results show clearly that an effective inhibition of boiler scale or similar deposits is achieved with the polymerization products according to the invention, or that precipitation of components of the hard water can be prevented. The hard water resistance is comparable to or better than a commercially available product on the market which is based on polyacrylates.

Flocculating effect

The flocculation effect of the polymerization products according to the invention is measured in a blue clay suspension produced in the laboratory. This suspension consists of 18 g blue clay in 1 liter of water and is suspended with a rapidly rotating agitator and transferred into a 250-ml test cylinder measuring 5 cm in diameter. There a slow finger agitator continues to agitate the solution and it is mixed with 2.5 ml of 20% aluminum sulfate solution. After 20 seconds 2 or 4 ppm flocculation polymer is added and after another 5 seconds agitation is stopped. The flocculation value measured is the time it takes the surface of the flocculated blue clay suspension to sink between two markings in the center of the cylinder at 4 cm distance from each other.

| Example | Flocculation time [sec] 2 ppm polymer | Flocculation time [sec] 4 ppm polymer |
|---|---|---|
| 19 | 42.8 | 33.4 |
| Commercially available co-polymerized flocculation based on acrylamide/DIMAPA-Quat. | 10–5 | |

What is claimed is:

1. A method of the enzyme-catalyzed radical grafting of ethylenic non-saturated anionic, cationic or neutral water-soluble monomers on their mixtures on lignin with radically oxidizing enzymes, wherein the grafting is carried out in aqueous solution in the presence of 0.01 % up to 10% by weight of organic peroxides and/or hydroperoxides, related to the monomers, which are at least partially soluble in the reaction medium, at a pH value in the range of 3 to 8, the molecular weights of the polymerization products lying in the range between 1000 and 10,000,000.

2. The method of claim 1, wherein the oxidizing enzymes are selected from the group consisting of laccase, lignin peroxidase and manganese peroxidase.

3. The method of claim 1, wherein the reaction medium is water.

4. The method of claim 1, wherein the grafting reaction is carried out at pH values in the range of 3 to 8.

5. The method of claim 4, wherein the pH value is in the range of 4 to5.

6. The method of claim 1, wherein the grafting reaction is carried out at a temperature in the range of 10 to 60 C.

7. The method of claim 6, wherein the grafting reaction is carried out at a temperature in the range of 20 to 50 C.

8. The method of claim 1, wherein the peroxides/hydroperoxides are selected tom the group consisting of t-butylhydroperoxide, mono and dihydroperoxide of dioxane and cumolhydroperoxide.

9. The method of claim 1, wherein polymerization is carried out in presence of reducing heavy metal salts.

10. The method of claim 1, wherein the anionic monomer is selected from the group consisting of (meth)acrylic acid, maleinic acid anhydride, (meth)acrylamidomethylpropanesulfonic acid and (meth)allylsulfonate.

11. The method of claim 1, wherein the catonic monomer is selected from the group consisting of N,N-dimethylaminopropyl(meth)acrylamide and N,N dimethylaminoethyl(meth)acrylate, and wherein amino nitrogen is quaternated or neutralized.

12. The method of claim 1, wherein the neutral monomer is selected from the group consisting of (meth)alycramide, (meth)acrylnitrile, hydroxyethyl(meth)acrylate, n-vinylpyrrolidone and methoxypolyethyleneglycol (meth)acrylate.

13. The method of claim 1, wherein the grafting is carried out while using interlinked monomers.

14. The method of claim 1, wherein contents of the lignin components in the reaction medium do not exceed 25% by weight.

15. The method of claim 14, wherein the contents of the lignin components is 15% by weight.

16. The method of claim 14, wherein the contents of the lignin components is 10% by weight.

17. The method of claim 1, wherein a graft polymerization product is isolated from the reaction medium and is broken up.

18. The method of claim 17, wherein the isolated graft polymerization product is dried, ground and sieved.

19. The method of claim 17, wherein the isolated graft polymerization product is subjected to a surface interlinking at a temperature in the range of 100–250 C.

20. The method of claim 18, wherein the temperature is in the range of 150–200 C.

21. Graft polymerization products of lignin and unsaturated monomers, obtained from the method according to claim 1.

22. Products made from the method according to claim 1 for absorption of water and aqueous liquids and for controlled release of previously added active ingredients.

23. Products made from the method according to claim 1 for flocculation of municipal and industrial sewage.

24. Products made from the method according to claim 1 for water softening in cooling circuits, washing, dying and bleaching processes.

25. Products made from the method according to claim 1 for dispersion of inorganic and organic pigments, hard water components and drilling sludge.

26. Products made from the method according to claim 1 for thickening of water or aqueous preparations.

27. Products made from the method according to claim 1 for binding and agglomeration agents for wood work materials and mineral and organic dust.

* * * * *